March 31, 1953 D. F. WINTER 2,633,536

ULTRAHIGH-FREQUENCY PULSING SYSTEM

Filed April 7, 1945

INVENTOR.
DAVID F. WINTER

BY William D. Hall

ATTORNEY

Patented Mar. 31, 1953

2,633,536

UNITED STATES PATENT OFFICE 2,633,536

ULTRAHIGH-FREQUENCY PULSING SYSTEM

David F. Winter, Cambridge, Mass., assignor, by mesne assignments, to the United States of America as represented by the Secretary of War Application April 7, 1945, Serial No. 587,188

4 Claims. (Cl. 250—36)

Figure 1A:
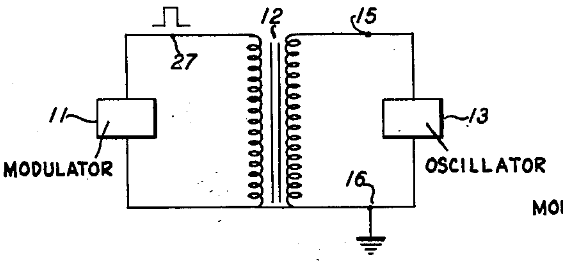

This invention relates to an ultrahigh frequency oscillating system and more particularly to a system including a modulator circuit.

During the operation of an ultrahigh frequency modulator-oscillator circuit two impedances will appear as seen by the modulator or driving circuit. One of these impedances appears while the oscillator is not oscillating and is of relatively high value. The second of these impedances appears while the oscillator is oscillating and is of relatively low value. In the modulator-oscillator circuit being discussed, after the voltage from the modulator is applied to the oscillator, some finite time must elapse before oscillations begin. During this time the oscillator will present the relatively high impedance to the modulator. After oscillations begin, the impedance seen by the modulator drops, and, as a result, the voltage applied to the oscillator drops. In many instances, for reasons of maximum power output, it is desired to have the operating voltage, i. e. the voltage across the oscillator during oscillations, at the highest possible level. As is well understood in the art, the maximum allowable voltage which may be applied to the oscillator will be just less than the break-down or arcing-over voltage that appears anywhere in the modulator-oscillator circuit. However, in the modulator circuits being discussed, just after voltage is applied from the modulator to the oscillator, and before the oscillator begins to oscillate, the voltage across the oscillator is higher than it is when it is oscillating. Thus, it is seen that the voltage across the oscillator, when it is not oscillating, causes break-down before the oscillator begins to draw current and oscillate. This then will limit the maximum operating voltage to a value somewhat less than the break-down voltage. Furthermore, the high initial voltage will charge the distributed capacitance of the system. This charge leaks off when the oscillator oscillates. The increased current due to this discharge is sometimes sufficient to cause break-down of the oscillator.

An object of the present invention, therefore, is to provide a system permitting use of higher operating voltages in modulator-oscillator circuits.

A further object of this invention is to provide a system permitting use of a higher average current during the period of oscillation.

In accordance with the present invention there is provided a coupling means connecting a generator to a load. A "despiking circuit" consisting of a resistance and a capacitor are connected across the coupling means, and the parameters of this R.-C. circuit and its time constant are selected so that the energy from the generator will be divided between the coupling means and the despiking circuit only for a very short interval of time between the application of the modulator voltage and the instant the oscillator begins to draw full load current. The resistance of this circuit is chosen substantially equal to the impedance of the modulator, and the capacity is chosen small enough to be almost completely charged a very short time after the oscillator draws full load current. Thus the despiking circuit functions as an automatic means for protecting the load, which is usually an ultrahigh frequency oscillator, from flash-overs produced by the spike voltages, or high voltage overshoots produced in the outputs of the modulators.

The circuit has its most pertinent application in radar systems where extremely high power must be impressed on the magnetrons during a very short interval of time. In the system of this type the modulator generally consists of a line pulse modulator having a pulse-forming network which is charged to a very high potential and discharged through the primary of a transformer, the secondary of which is connected across the magnetron. Most practical line pulse modulators do not produce a perfectly uniform flat-top wave because this is usually costly and unrewarding. As a consequence, the rate of rise and the overshoot on the leading edge of the voltage wave are important in determining the ability of the magnetron to operate at high power levels. Since the magnetron operates at the magnetic field far above the normal cut-off value, it is impossible for electrons to reach the anode without the aid of the radial frequency field. Therefore, until the field is established, little power is drawn from the pulser and a momentary over-volting of the magnetron results. This phenomenon is particularly prominent in the case of line type modulators or pulsers where the voltage across the magnetron can rise to twice normal if the magnetron fails to draw power. This high-voltage "spike" can give rise to all manner of sparking and mode troubles. The invention discloses the R.-C. network which acts as a protective shunt during the existence of the above high-voltage spike. The time constant of the shunting circuit is adjusted so that it ceases to exert any influence upon the circuit at the instant the magnetron begins to oscillate. When the magnetron begins to oscillate then the shunt ceases to draw any current and therefore the entire power of the line type modulator is not divided between the magnetron and the shunt circuit but is delivered solely to the magnetron. In a circuit of this type it is a matter of primary importance that the time constant of the shunt is adjusted so as to remove itself completely out of the circuit at the instant the magnetron begins to oscillate. This is accomplished by imparting the previously mentioned necessary values to the resistance and capacity of the shunt.

For a better understanding of the invention, together with other and further objects thereof, reference is had to the following description taken in connection with the accompanying drawings, and its scope will be pointed out in the appended claims.

Figure 1B:
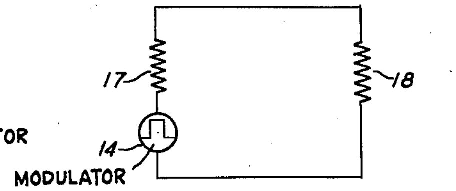
Figure 1C:
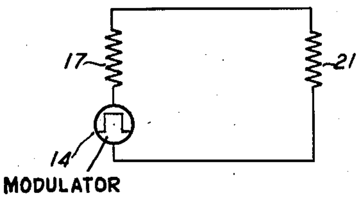
Figure 1D:
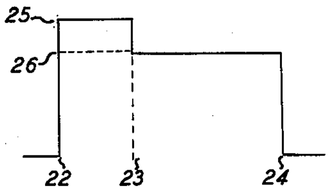
Figure 2A:
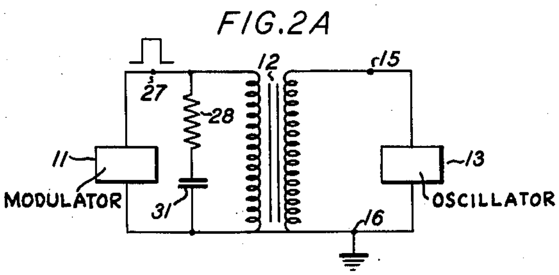
Figure 2B:
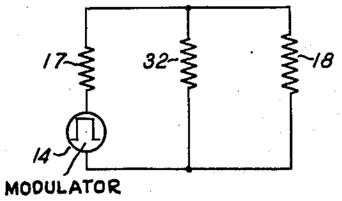
Figure 2C:
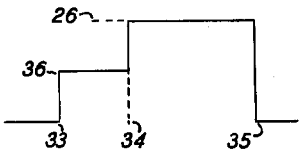

In the accompanying drawings:

Figs. 1A–1D, inclusive, show a modulator-oscillator circuit, its equivalent circuits and the waveform of the voltage applied to the oscillator; and Figs. 2A–2C, inclusive, and 1C show an improved modulator-oscillator circuit, its equivalent circuits, and the waveform of the voltage applied to the oscillator of the circuit.

Referring now more particularly to Figs. 1A–1D, inclusive, there is shown a schematic diagram of a modulator-oscillator circuit with associated equivalent circuits and waveforms applied to the oscillator portion. Fig. 1A shows a modulator 11, shown in block form, which in the previously mentioned radar systems will consist of a line pulse modulator including a pulse forming network, a direct current source for charging this pulse forming network, and an electronic switch for quickly discharging this network across the primary of transformer 12 illustrated in the figure. It is this discharge of the pulse forming network that generates a rectangular pulse the oscillogram of which is illustrated directly above the numeral 27 in the figure. The output of this modulator is coupled by a transformer 12 to an oscillator 13 shown in block form. As mentioned previously in the case of the radar systems this oscillator takes the form of a multicavity magnetron capable of delivering exploratory pulses having a power of the order of several megawatts. Since the range of the radar system is a function of the power of the transmitted pulse it becomes a matter of great importance to operate the magnetrons just below the previously mentioned flash-over voltage in order to deliver the required maximum power. Fig. 1B shows the equivalent circuit of the circuit of Fig. 1A during the time the oscillator is not oscillating. In Fig. 1B the generator 14 is the impedanceless equivalent of the modulator 11 as seen from the terminals 15 and 16 in Fig. 1A. The resistor 17 is equal in magnitude to the effective resistance of the modulator 11 as seen from the terminals 15 and 16. The resistor 18 is the effective resistance of the oscillator 13 during the time that it is not oscillating. In Fig. 1B the generator 14, the resistor 17, and the resistor 18 are connected in series. Fig. 1C shows the equivalent circuit of the circuit of Fig. 1A during the time the oscillator is oscillating. This circuit is identical to the circuit shown in Fig. 1B except that resistor 21 is substituted for resistor 18. The resistor 21 is the effective resistance of the oscillator 13 during the time that it is oscillating. In Fig. 1C the generator 14, the resistor 17, and the resistor 21 are connected in series. Fig. 1D shows the wave form of the voltage developed across the oscillator 13 by the modulator 11. The interval 22—23 is the time required by the oscillator 13 to start oscillating. The interval 22—24 indicates the total time during which voltage is applied to the oscillator 13. The voltage levels 25 and 26 indicate, respectively, the voltage applied to the oscillator 13 before and during oscillations.

The output voltage of the modulator 11 will normally be rectangular in waveform. The waveform of this output is shown at terminal 27. Since the leading edge of this voltage is very steep, its application to the oscillator 13 is effectively the same as if a D.-C. voltage were applied to this oscillator.

Referring now to the equivalent circuit of Fig. 1B, it is seen that this voltage will be developed across the resistors 17 and 18. The division of the voltage between the resistors 17 and 18 is proportional to the relative magnitudes of these resistors. The voltage across the oscillator 13 will be the same as the voltage across the resistor 18. This voltage is indicated by the level 25 in Fig. 1D. For example, in Fig. 1B if resistor 17 equals 100 ohms and resistor 18 equals 2400 ohms and the voltage applied from the generator 14 is 2500 volts, the voltage across the resistor 18 as represented by the level 25 would be $$\frac{R_{18}}{R_{17}+R_{18}}\times E=\frac{2400}{100+2400}\times 2500=2400 \text{ volts}$$

In the above equation, $R_{17}$ is the resistance in the resistor 17, $R_{18}$ is the resistance of the resistor 18 and E is the amplitude of the voltage applied from the generator 14. After a period of time represented by 22—23 in Fig. 1D the oscillator 13 of Fig. 1A begins to oscillate. In the equivalent circuit of Fig. 1C generator 14 and resistor 17 will be unchanged, but the effective oscillator resistor 18 will change to a new resistance represented by resistor 21. In the case being considered, the resistor 21 is smaller than the resistor 18. This will normally be the case for most oscillators. Due to a change in the relative sizes of the resistors the voltage across the oscillator will change to a lower value. This new value of voltage is represented in Fig. 1D by the level 26. If we assume for example that the resistor 21 equals 400 ohms and the other values of resistance and voltage are as used in the preceding example, the operating level 26 can be calculated as follows:

$$\frac{R_{21}}{R_{21}+R_{17}}\times E=\frac{400}{400+100}\times 2500=2000 \text{ volts}$$

In the above equation, $R_{21}$ is the resistance of the resistor 21, and the other designations and values are consistent with those previously used.

It can be seen by these examples that the operating voltage 26 is much lower than the initial voltage 25 which is applied to the oscillator, and hence much less power is available at the oscillator's output than would be available if the operating voltage rather than the initial voltage were the maximum and limiting factor. If the waveform of the modulator output is other than rectangular, the waveform of Fig. 1D will, of course, be changed and the initial voltage may or may not be the limiting factor.

Referring now more particularly to Figs. 2A–2C, inclusive, there is shown an embodiment of an improved modulator-oscillator circuit and some illustrations to facilitate explaining the operation of the circuit. The circuit of Fig. 2A is the same as the circuit shown in Fig. 1A except for the addition of a resistor and a capacitor. Like parts in each circuit are marked with the same designation. The added resistor and capacitor are designated by 28 and 31, are connected in series in relation to each other and are connected in parallel with the primary of the transformer 12. Coupling means other than transformers may be used in the embodiment shown in Fig. 2A and it is not the intent to limit the invention to the use of transformer coupling. The resistor 28 will normally be approximately equal to the impedance of the modulator 11 as seen from the terminals 27—16. The capacitor 31 is normally of a size such that the product of the number representing the resistance in ohms of the resistor 28 and the number representing the capacitance in farads of the capacitor 31 is approximately equal to one and one-half times the number of seconds required by the oscillator 13 to begin to oscillate. In the art, this is equivalent to saying that the time constant of the resistor 28 and the capacitor 31 is approximately equal to one an done-half times the starting time of the oscillator 13. These representative values of resistance and capacitance are not to be taken as limitations of the invention. The circuit of Fig. 2B is electrically equivalent to the circuit of Fig. 2A when the oscillator is not oscillating. This circuit is the same as the circuit in Fig. 1B except for the addition of a resistor 32. Like parts in each circuit will bear the same designation. The resistance 32 is the equivalent of the resistor 28 as seen from terminals 15—16 and is in parallel with resistor 18. The electrically equivalent circuit for the circuit of Fig. 2A during the time the oscillator is oscillating is shown in Fig. 1C. Fig. 2C shows the voltage developed across the oscillator 13 by the modulator 11 in the circuit of Fig. 2A. It is realized that the waveform in Fig. 2C is not absolutely accurate since there actually exists an exponential waveform rather than a straight line waveform during the time interval 33—34. However, for purposes of simplicity of explanation, the linear waveform shown will be used. The time interval 33—34 is determined by, but is not equal to, the time constant of resistor 28 and capacitor 31. The interval 33—35 is the total time during which voltage is applied to the oscillator 13. The voltage level 26 in Fig. 2C corresponds to the level 26 in Fig. 1D. The voltage level 36 is determined from the equivalent circuit of Fig. 2B.

The output voltage of the modulator 11 in Fig. 2A being normally rectangular in form, it has a very steep leading edge. The waveform of this voltage is indicated at terminal 27 in Fig. 2A. Application of this voltage to a load is somewhat similar to the application of a D.-C. voltage of the same magnitude to a load. The chief advantage of the circuit of Fig. 2A over other circuits which might accomplish the same result lies in its simplicity and minimum number of components. Referring to the equivalent circuit of Fig. 2B, it is seen that the generator voltage will be developed across the resistors 17, 18 and 32. The voltage across the oscillator 13 will be the voltage across the resistor 32. The use of a numerical example will again aid greatly in showing quantatively the action of the circuit. Numerical values used are hypothetical and are not to be taken as limitations of the invention. If resistor 32 equals 100 ohms and the other values of resistance and voltage are as used in the previous example in this specification the voltage applied to the oscillator 13 during the time interval 33—34 and as indicated by the level 36 will be $$\frac{R_x}{R_x+R_{17}}\cdot E=\frac{96}{96+100}\cdot 2500=1225 \text{ volts}$$

In the above equation $R_x$ is the equivalent resistance of the resistors 18 and 32 in parallel, and the other notations are consistent with those previously used. After the time interval 33—34 the capacitor 31 is fully charged and no current flows in the resistance 28. This then is the equivalent of an open circuit in the resistance-capacitance circuit. Since Fig. 1C is the electrical equivalent for the circuits in Figs. 1A and 2A, when the oscillator is oscillating, it is seen that the voltage across the oscillator 13 in Figs. 1A and 2A will be the same during this oscillating interval. The amplitude of this voltage is indicated by level 26 in Figs. 1D and 2C. By reference to the example worked out for Figs. 1B and 1C, this level is seen to be 2000 volts.

It is quite evident that the operating voltage level 26, is in this case the limiting factor. Therefore, it can be seen that the operating level 26 of Fig. 2C can be raised to the maximum consistent with safety and thus obtain a greater power output from the circuit of Fig. 2A than was obtainable from the circuit of 1A.

From the description of the invention it follows that it discloses a spike circuit which protects the ultrahigh frequency oscillators during the voltage overshoot and which removes itself automatically from the circuit at the instant the ultrahigh frequency oscillator begins to draw current. The latter feature prevents any wasting of power by the protective circuit during the useful portion of the modulation cycle and enables one to operate the magnetrons substantially at the flash-over voltage. This, in turn, increases the range and the signal to noise ratio in the radar systems.

While there has been described what is at present considered the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an ultrahigh frequency pulsing system including a modulator, said modulator having a pulse generating network, a pulse transformer having primary and secondary windings, a magnetron oscillator connected across said secondary winding and adapted to become operative in response to pulses appearing in said secondary winding, and a voltage limiting network connected across the primary of said transformer, said voltage limiting network including a resistor and a condenser serially connected with respect to each other, the time constant of said resistor-condenser combination, as found by multiplying the values of said resistor and condenser respectively expressed in ohms and farads, being substantially equal to 1.5 times the starting time, expressed in seconds, of said magnetron, and the impedance of said voltage limiting network being sufficient to divert enough voltage from said oscillator to prevent the burning out thereof by pulses from said modulator.

2. In an ultrahigh frequency transmitting channel including a line pulse modulator having a pulse generating network, a pulse transformer having primary and secondary windings, said primary winding being connected in series with said pulse generating network, a magnetron connected across said secondary winding and adapted to become operative in response to pulses appearing in said secondary winding, and a resistance-condenser network connected across said primary winding, said resistance and said condenser being connected in series with respect to each other, the resistance of said resistor being substantially equal to the impedance of said network and of said modulator, and the product of said resistance, expressed in ohms, times the capacity of said condenser, expressed in farads, being substantially equal to 1½ times the time in seconds required for said magnetron to begin oscillating after a pulse is impressed on said transformer by said pulse generating network.

3. In a pulse transmitting system, a pulse generator, a load circuit adapted to become operative in response to the output of said generator, a coupling circuit for connecting the output of said pulse generator to said load circuit, and a voltage limiting circuit connected in shunt with respect to said coupling circuit, said voltage limiting circuit comprising a resistance and a condenser connected in series with respect to each other, the time constant of said voltage limiting circuit, as found by multiplying the value of said resistance in ohms by the value of said condenser in farads, being substantially equal to the interval of time in seconds between the appearance of the pulse at said coupling circuit and the instant said load circuit begins to draw a substantially full load current, the impedance of said voltage limiting circuit becoming substantially equal to infinity at the instant said load circuit begins to draw said load current and prior to that time having an impedance sufficient to divert enough voltage from said load circuit to prevent it from being burned out by said generator.

4. In an ultrahigh frequency generating system including a modulator, said modulator having a pulse generating network, a pulse transformer having primary and secondary windings, said primary winding being connected in series with said pulse generating network, a magnetron connected across said secondary winding and adapted to become operative in response to pulses appearing in said secondary winding, and a resistance-condenser network connected across said primary winding, said resistance and said condenser being connected in series with respect to each other, the capacitance of said condenser having a value to make said condenser substantially charged the instant said magnetron begins to draw a substantially full load current, the product of said resistance, expressed in ohms, and said capacitance, expressed in farads, being substantially equal to 1.5 times the time in seconds required for said magnetron to begin oscillating after a pulse is impressed on said transformer by said pulse generating network, and the impedance of said resistance-condenser network being sufficient to prevent said magnetron from being burned out by said modulator pulses.

DAVID F. WINTER.

REFERENCES CITED

The following references are of record in the file of this patent:

UNITED STATES PATENTS

| Number | Name | Date |
|---|---|---|
| 2,020,950 | Lee | Nov. 12, 1935 |
| 2,122,393 | Robinson et al. | June 28, 1938 |
| 2,190,078 | Markowitz | Feb. 13, 1940 |
| 2,228,119 | Kinn | Jan. 7, 1941 |
| 2,431,952 | Maxwell | Dec. 2, 1947 |
| 2,448,364 | Ganz et al. | Aug. 31, 1948 |
| 2,449,443 | Bettler et al. | Sept. 14, 1948 |